United States Patent
Matsuyama et al.

(10) Patent No.: US 6,438,103 B2
(45) Date of Patent: *Aug. 20, 2002

(54) ATM NETWORK TIME MANAGEMENT METHOD

(75) Inventors: Tamami Matsuyama; Satoshi Ohashi, both of Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 122 days.

(21) Appl. No.: 08/912,792

(22) Filed: Aug. 18, 1997

(30) Foreign Application Priority Data

Aug. 21, 1996 (JP) .............................. 8-220155

(51) Int. Cl.[7] .......................... H04L 12/26; H04L 12/56
(52) U.S. Cl. ....................................... 370/230; 370/235
(58) Field of Search .................................. 370/230, 231, 370/232, 233, 234, 235, 236, 395, 397, 412, 468, 252, 253, 237, 238, 235.1, 236.1, 236.2, 395.1, 395.21

(56) References Cited

U.S. PATENT DOCUMENTS

| | | | | |
|---|---|---|---|---|
| 5,432,713 A | * | 7/1995 | Takeo et al. ................. 370/232 |
| 5,519,689 A | * | 5/1996 | Kim ............................. 370/232 |
| 5,581,546 A | * | 12/1996 | Roosma et al. .............. 370/253 |
| 5,694,554 A | * | 12/1997 | Kawabata et al. ........... 370/230 |
| 5,751,695 A | * | 5/1998 | Ohashi ......................... 370/218 |
| 5,784,303 A | * | 7/1998 | Petit ............................. 370/232 |
| 5,831,971 A | * | 11/1998 | Bonomi et al. .............. 370/230 |
| 5,854,783 A | * | 12/1998 | Kaganoi ....................... 370/232 |
| 5,862,127 A | * | 1/1999 | Kwak et al. ................. 370/233 |

FOREIGN PATENT DOCUMENTS

| | | |
|---|---|---|
| EP | 753980 | 1/1997 |
| JP | 4329733 | 11/1992 |
| WO | 96 34469 | 10/1996 |
| WO | 97 07615 | 2/1997 |

* cited by examiner

*Primary Examiner*—Chau Nguyen
*Assistant Examiner*—Soon-Dong Hyun
(74) *Attorney, Agent, or Firm*—Sughrue Mion, PLLC (57) ABSTRACT

In an ATM network time management method, a shaping operation is performed to equalize cell flows by generating the arrival time of an ATM cell on the basis of the arrival intervals of input ATM cells, and adding an optimum delay to the arrival time, thereby obtaining an ideal transmission time $t_o$. A flag is prepared to indicate whether the value of a timer counter for generating the arrival time of an ATM cell on the basis of the arrival time intervals of input ATM cells has exceeded a maximum timer cycle value. The shaping operation is performed by managing the arrival time of the ATM cell with reference to a relative time in accordance with the state of the flag.

5 Claims, 11 Drawing Sheets

IF $TET > t_a + \tau s$,
THEN $t_o = TET - \tau s$.

FIG. 2B

IF $TET \leq t_a + \tau s$ AND $t_a \leq TET$,
THEN $t_o = t_a$.

FIG. 2C

IF $TET \leq t_a + \tau s$ AND $t_a > TET$,
THEN $TET = t_a$, $t_o = t_a$

| | FLAG Ft | FLAG Ca | FLAG SETTING CONDITION | FLAG CANCELLATION CONDITION | OPERATION TO BE PERFORMED WHEN CELL ARRIVES |
|---|---|---|---|---|---|
| a | 0 | 0 | NONE | NONE | NORMAL ALGORITHM PROCESSING |
| b | 0 | 1 | WHEN TIMER VALUE =0, FLAG Ft IS SET TO "1" IF Ca=0 AND Ft=0. | WHEN CELL ARRIVES, FLAT Ft IS RESTORED TO "0" IF Ft=1. | TET= ta AND to= ta ARE SET |
| c | 1 | 0 | IF NEXT TET VALUE EXCEEDS MAXIMUM TIMER VALUE T, FLAT Ca IS SET TO "1" | WHEN TIMER VALUE =0, FLAT Ca IS RESTORED TO "0" IF Ca=1 AND Ft=0. | TET = TET+MAXIMUM TIMER VALUE T IS SET TO CORRECT TET VALUE, AND ALGORITHM PROCESSING IS THEN PERFORMED |
| d | 1 | 1 | ABNORMAL STATE (WHICH CANNOT OCCUR IN NORMAL PROCESSING) | | |

ATM NETWORK TIME MANAGEMENT METHOD

BACKGROUND OF THE INVENTION

1. Field of the Invention

The present invention relates to an ATM network time management method suitably used for a high-speed broadband network such as an ISDN.

2. Description of the Prior Art

Recently, an ATM (Asynchronous Transfer Mode) network has been developed as a technique of realizing multimedia services. In the ATM network, with an increase in cell delay variation (CDV), the peak cell rate increases, and a traffic with a high burstiness may be included. As a result, the utilization efficiency of the network decreases. For this reason, cell flows must be equalized by adding an optimum delay to each cell at each connection.

In algorithm computation for this equalization, the ideal transmission time of an arrival cell is calculated on the basis of the arrival time of a preceding cell. This operation demands time management for determining the relationship in magnitude between time parameters required for the algorithm computation by referring to a timer value.

For example, such a technique is disclosed in Japanese Unexamined Patent Publication No. 4-329733. According to this reference, information indicating the time at which the first cell arriving after a measuring/monitoring operation was started is stored in a memory at each node in the ATM network. If a predetermined measurement allowable time elapses in the interval between this time and the time at which the next cell having the same identifier as that of the first cell arrives, the occurrence of an abnormality is determined, and measurement is performed again.

With this arrangement, it is unnecessary to provide a register with every VPI or VCI. A reduction is circuit size can therefore be attained. In addition, even if a cell arrives at a time beyond the physical arrival time interval storage limit of the memory, no erroneous cell flow rate information is output, and accurate cell flow rate information can be provided.

In the above conventional time management method, time management is performed on the basis of absolute times, and hence requires a timer length based on the maximum operation time after the time the power supply is turned on. The bit length of the timer counter becomes therefore long, resulting in an increase in circuit size. As the circuit size increases, the processing speed decreases.

SUMMARY OF THE INVENTION

The present invention has been made in consideration of the above situation, and has as its object to provide an ATM network time management method which can increase the processing speed by reducing the circuit size.

In order to achieve the above object, according to the basis aspect of the present invention, there is provided an ATM network time management method of performing a shaping operation to equalize cell flows by generating an arrival time of a cell on the basis of arrival intervals of input cells and by adding an optimum delay to the arrival time, thereby obtaining an ideal transmission time $t_o$, comprising preparing a flag indicating whether a value of a timer counter for generating an arrival time of a cell on the basis of arrival time intervals of input cells has exceeded a maximum timer cycle value, and performing the shaping operation by managing the arrival time of the cell with reference to a relative time in accordance with a state of the flag.

In the basic aspect, according to the form of the flag, the flag comprises a first flag indicating whether a next TET value obtained by adding a minimum cell interval Ts to a theoretical transmission time TET has exceeded a maximum timer value and a next timer cycle has been started, and a second flag indicating whether a cell arrival time $t_a$ of a cell has come in a cycle longer than the minimum cell interval Ts, and has exceeded the maximum value of the timer.

According to the form of the flag, the first and second flags are prepared in units of VPI/VCI numbers of input cells.

According to the form of the flag, the method further comprises setting the first flag to "0" when the next TET value obtained by adding the minimum cell interval Ts to the theoretical transmission time TET has exceeded the maximum timer value, and the next timer cycle has been started, and setting the first flag to "1" when the next TET value has not exceeded the maximum timer value, and the next timer cycle has not been started, setting the second flag to "1" when the cell arrival time $t_a$ of the cell has come in a cycle longer than the minimum cell interval Ts, and has exceeded the maximum value of the timer, and setting the second flag to "0" when the cell arrival time $t_a$ has not come in a cycle longer than the minimum cell interval Ts, and has not exceeded the maximum value of the timer, performing a normal shaping operation when both the first and second flags are set to "0", setting the theoretical transmission time TET to be equal to the arrival time $t_a$ of the cell, and setting the ideal transmission time $t_o$ to be equal to the arrival time $t_a$ of the cell when the first and second flags are respectively set to "1" and "0", performing a shaping operation by correcting the theoretical transmission time TET according to TET=TET+maximum timer value t when the first and second flags are respectively set to "0" and "1", and performing processing for an abnormal state when both the first and second flags are set to "1".

According to the basic aspect, a timing at which the flag is updated can be shifted in units of VPI/VCI numbers.

In the present invention, there are provided flags indicating on the basis of the arrival intervals of input cells whether the timer counter value of the timer counter for generating the arrival time of a cell has exceeded the maximum timer cycle value, and a shaping operation is performed by managing the arrival time of the cell with reference to a relative time in accordance with the states of these flags. Therefore, the bit length of the timer counter can be decreased, and the circuit size can be reduced as compared with a case in which time management is performed on the basis of absolute times. In addition, since the bit length of the timer counter can be decreased, the number of adders, subtracters, and the like can be decreased. Consequently, the computation time can be shortened to realize high-speed processing.

The above and many other objects, features and advantages of, the present invention will become manifest to those skilled in the art upon making reference to the following detailed description and accompanying drawings in which preferred embodiments incorporating the principles of the present invention are shown by way of illustrative example.

DETAILED DESCRIPTION OF THE PREFERRED EMBODIMENTS

Several preferred embodiments of the present invention will be described below with reference to the accompanying drawings.

An ATM network time management method of the present invention is applied to a high-speed broadband network such as a B-ISDN or the like.

Prior to the description of an embodiment, the principle of a shaping function used in the present invention will be briefly described first.

In an ATM network, since ATM cells (to be referred to cells hereinafter) are transmitted at discrete times, a CDV (Cell Delay Variation) occurs. As the CDV increases, a cell with a high burstiness is included in the network. As a result, the utilization efficiency of the network decreases. To increase the utilization efficiency of the network by decreasing the burstiness of the cell in the network, a predetermined delay is added to the cell to equalize cell flows. Equalizing cell flows by such delay addition is called shaping.

Figure 1:
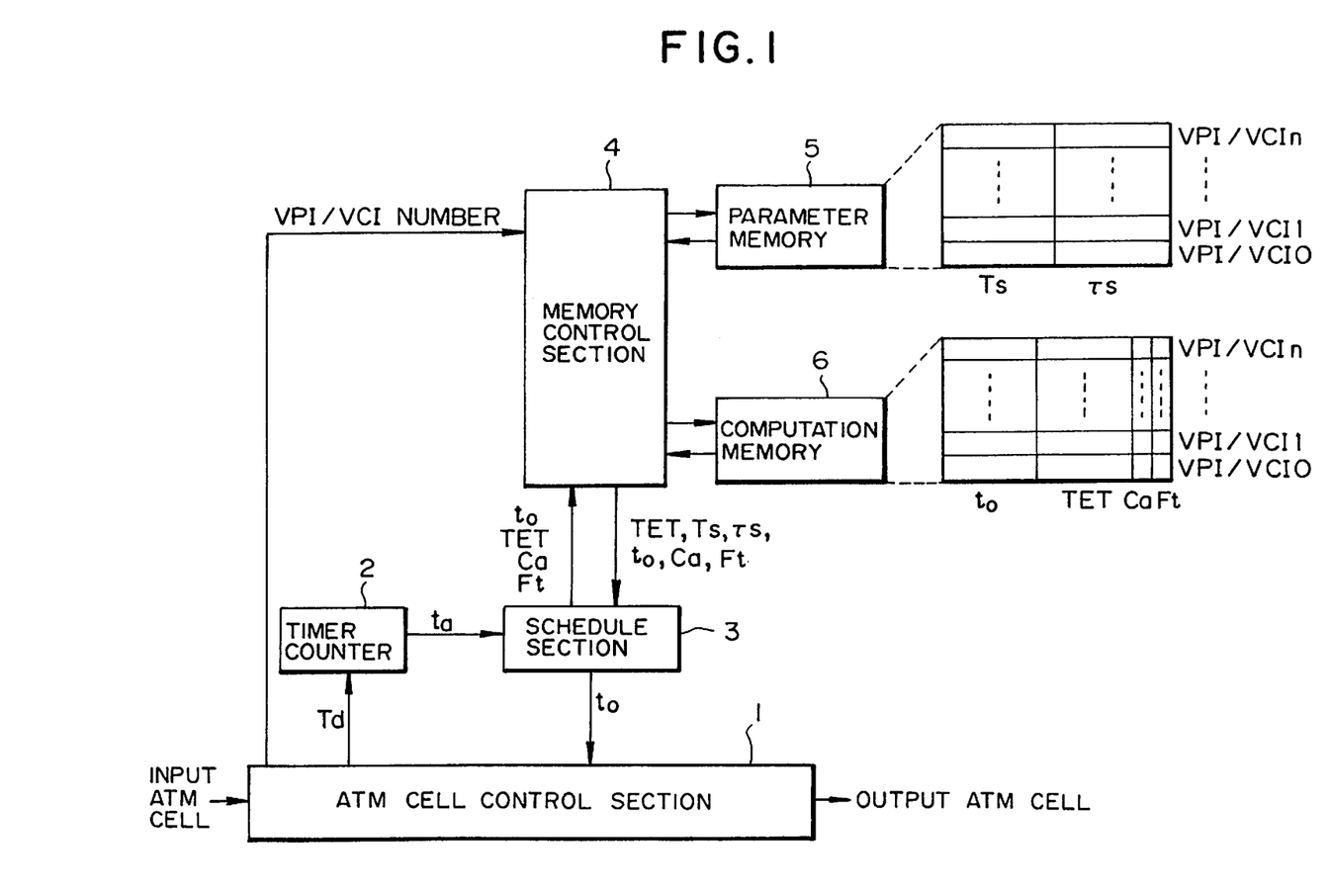
FIG. 1 is a block diagram showing the arrangement of an embodiment of the present invention.

The arrangement of an embodiment of the present invention will be described next with reference to FIG. 1. An ATM cell control section 1 detects input cells, and manages an arrival time $t_a$ of each input cell by using a timer counter 2 which increments in a cell cycle synchronous with arrival time intervals Td of the detected cells. The ATM cell control section 1 also detects the VPI/VCI number of each input cell, and causes a memory control section 4 to read out various parameters (a minimum cell interval Ts, a residual CDV allowable value τs, an ideal transmission time $t_o$, a theoretical transmission time TET, timer flags Ca and Ft, and the cell arrival time ta) from the storage areas of a parameter memory 5 and a computation memory 6 in which the VPI/VCI number of the arrival cell is stored.

Fixed data set when the apparatus is started up are stored in the parameter memory 5 in units of VPI/VCI data, and the computation results obtained by a schedule section 3 are stored in the computation memory 6 in units of VPI/VCI data. Note that when the apparatus is started up, initialization is performed, and the initial value "0" is stored in the computation memory 6.

The schedule section 3 performs a computation based on a shaping algorithm by using the cell arrival time $t_a$ output from the timer counter 2 and the various parameters read out from the parameter memory 5 and the computation memory 6. The schedule section 3 stores, through the memory control section 4, the computation results (TET, $t_o$, Ca, Ft) in the area of the computation memory 6 in which the VPI/VCI number is stored. At the same time, the ideal transmission time to is output as the output time of the cell to the ATM cell control section 1. The cell is then output at the time based on the algorithm computation result obtained by the schedule section 3, thus performing a shaping operation.

The operation of this embodiment will be described next.

(1) Outline of Shaping Algorithm

An outline of the shaping algorithm used in the schedule section 3 (see FIG. 1) will be described next with reference to FIGS. 2A to 2D.

In the ATM network, cells are synchronously transferred. If, therefore, no limitations are imposed on the flow rate of cells flowing into the network, a load based on congestion and the like is imposed on the network. For this reason, the maximum value of an ATM cell flow must be specified. As a parameter for managing a cell flow rate, a PCR (Peak Cell Rate) is used.

In the shaping algorithm, the theoretical transmission time TET is determined by the minimum cell interval Ts as the reciprocal of the PCR. To equalize cell transmission times on the basis of the minimum cell interval Ts, the ideal transmission time $t_o$ is determined within the range of the residual CDV allowable value τs with respect to the theoretical transmission time TET, thus performing a shaping operation.

Figure 2A:
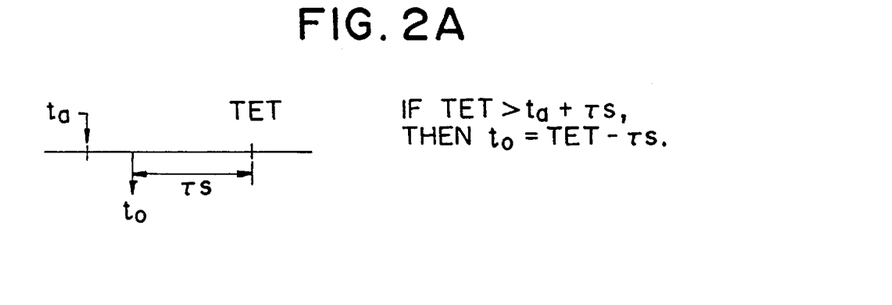
FIGS. 2A to 2D are views for explaining a shaping algorithm.

When the arrival time $t_a$ of a cell exceeds the residual CDV allowable value τs with respect to the theoretical transmission time TET corresponding to the cell, i.e., the case shown in FIG. 2A occurs, it is determined that the requirement of the PCR is not satisfied, and a shaping operation is performed.

Figure 2B:
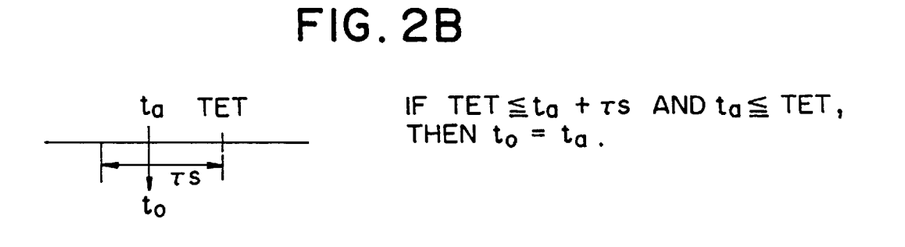

In contrast to this, if the arrival time $t_a$ of a cell falls within the range of the residual CDV allowable value τs with respect to the theoretical transmission time TET as in the case shown in FIG. 2B, it is determined that the CDV falls within the specified CDV allowable range. The arrival cell is therefore output as it is.

Figure 2C:
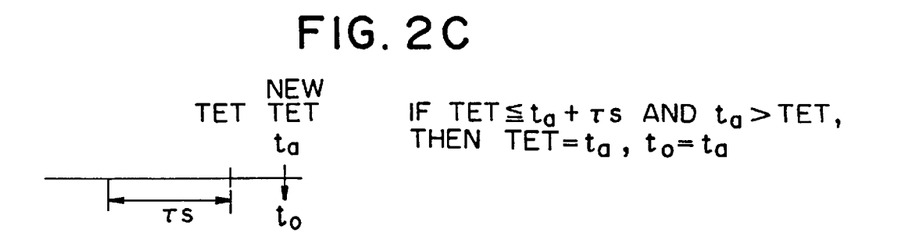

If the arrival time $t_a$ of a cell is later than the theoretical transmission time TET as in the case shown in FIG. 2C, it is determined that the cell rate is lower than the PCR. The theoretical transmission time TET is therefore updated to the cell arrival time $t_a$ as a new reference, and the arrival cell is output as it is.

To perform an algorithm computation, the arrival times of cells must be managed. In this case, time management is performed by using a timer counter corresponding to the minimum operation time instead of using a timer counter corresponding to the maximum operation time after the time the power supply is turned on, and whether the measurement time exceeded the maximum measurement interval is determined on the basis of two types of flags (Ca, Ft).

Figure 2D:
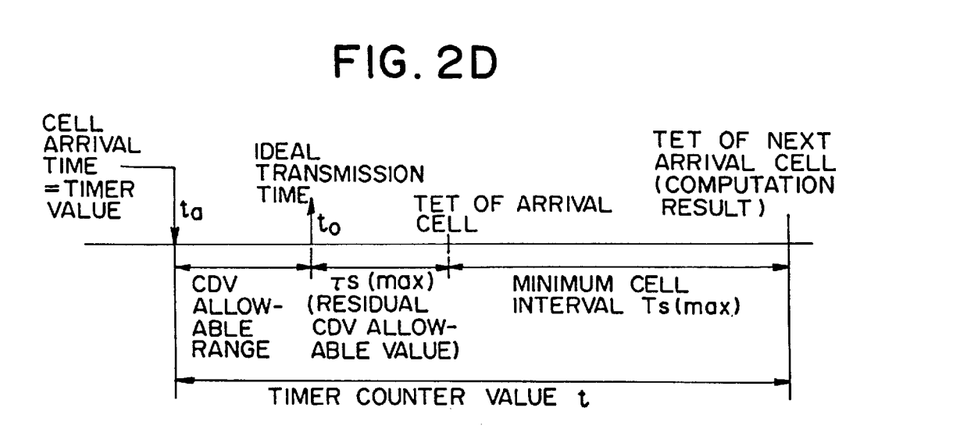

When the cell arrival time $t_a$ is set to "0", a minimum timer counter value t is given by t=CDV allowable range +τs(max)+Ts(max) where τs(max) and Ts(max) are the maximum values of the respective parameters, as shown in FIG. 2D.

When a cell arrives at a time beyond the CDV allowable range, it is determined that the contract traffic amount specified in the network is violated, and the cell is discarded as a violation cell. Alternatively, the priority of the cell is decreased so that the cell is not subjected to shaping. For this reason, with the minimum timer counter value t, the theoretical transmission time TET of the next arrival cell following the cell which arrived at the arrival time $t_a$ can be managed within two timer cycles.

(2) Outline of Shaping Processing

Figure 3:
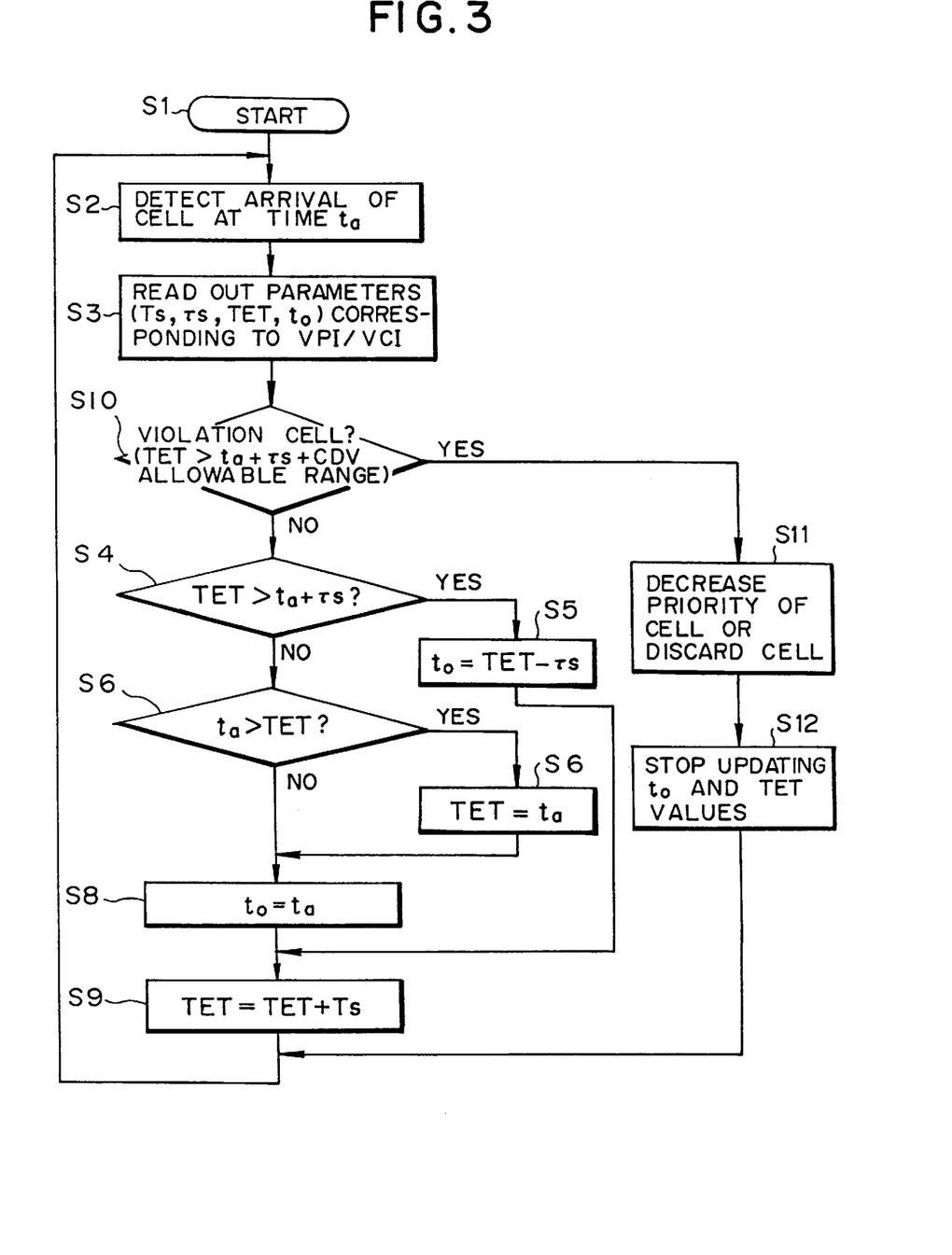
FIG. 3 is a flow chart showing a shaping operation.

An outline of shaping processing will be described next with reference to FIG. 3. First of all, when the power supply is turned on, and system initialization is performed, the flow advances to step S1, in which the schedule section 3 resets various parameters and sets initial values. The flow then advances to step S2.

In step S2, the arrival time $t_a$ of a cell is detected. In step S3, the parameters (Ts, τs, TET, $t_o$) corresponding to the VPI/VCI data corresponding to the arrival cell are read out.

The flow then advances to step S10 to check whether the arrival cell is a violation cell, i.e., whether the theoretical transmission time TET is larger than "$t_a$+τs+CDV allowable range".

If it is determined that the arrival cell is a violation cell, YES is obtained in step S10, and the flow advances to step S11 to decrease the priority of the cell or discard it. The flow advances to step S12 to stop updating the ideal transmission time $t_o$ and the theoretical transmission time TET. The flow then returns to step S2.

If NO is obtained in step S10, i.e., it is determined that the arrival cell is not a violation cell, the flow advances to step S4 to check whether the theoretical transmission time TET is larger than $t_a$+τs.

If it is determined that the theoretical transmission time TET is larger than $t_a$+τs, i.e., the case shown in FIG. 2A occurs, YES is determined in step S4, and the flow advances to step S5 to perform a shaping operation and determine the ideal transmission time $t_o$ ($t_o$=TET−τs). Thereafter, the flow advances to step S9 to update the theoretical transmission time TET.

In contrast to this, if NO is obtained in step S4, the flow advances to step S6. In step S6, it is checked whether the cell arrival time $t_a$ is larger than the theoretical transmission time TET.

If the cell arrival time $t_a$ is later than the theoretical transmission time TET, i.e., the case shown in FIG. 2C occurs, YES is obtained in step S6, and the flow advances to step S7 to output the arrival cell as it is.

If the cell arrival time $t_a$ falls within the range of Ts with respect to the theoretical transmission time TET, i.e., case shown in FIG. 2B occurs, it is determined that the cell rate is lower than the PCR. The theoretical transmission time TET is therefore updated to the cell arrival time $t^a$ as a new reference, and the arrival cell is output as it is.

(3) Shaping Operation

A shaping operation based on the minimum timer counter using the two flags Ca and Ft will be described next with reference to FIGS. 4 to 8.

① Flag Updating Processing

The flags Ca and Ft respectively have flag values in units of VPI/VCI numbers. The flag Ca indicates whether the next TET value obtained by adding the minimum cell interval Ts to the theoretical transmission time TET has exceeded the maximum timer value, and the next timer cycle has been started.

The flag Ft indicates whether the cell arrival time $t_a$ has come in a cycle longer than the minimum cell interval Ts, and has exceeded the maximum value of the timer.

Figure 4:
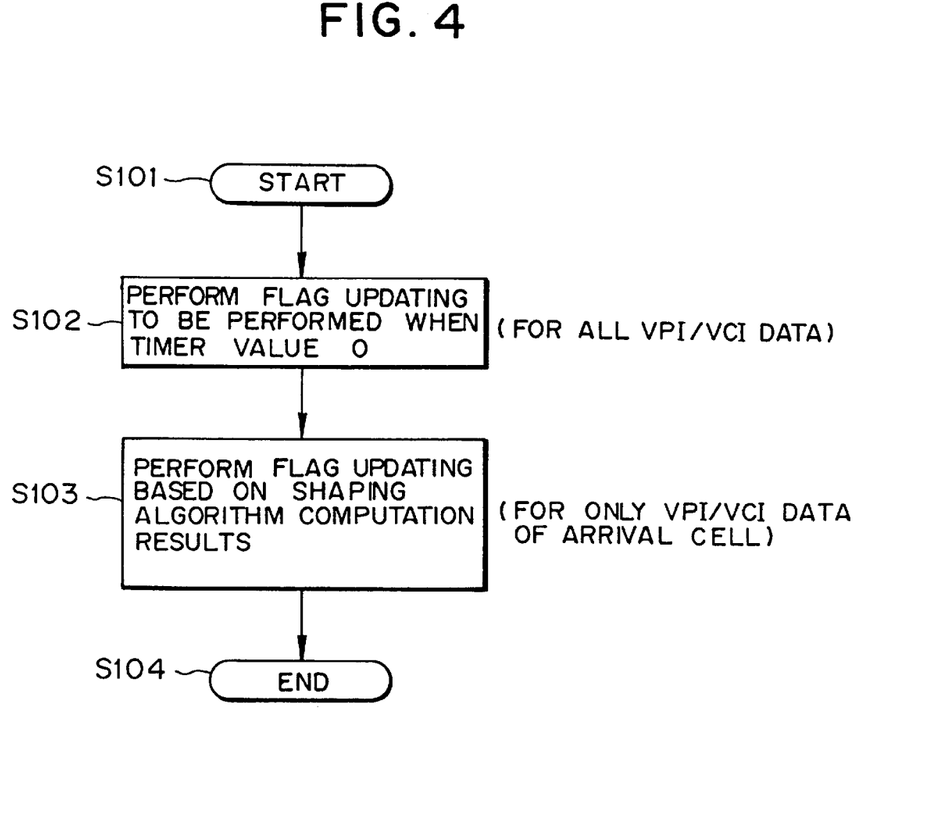
FIG. 4 is a flow chart showing a flag updating method.

Updating of the flags Ca and Ft having such attributes will be described with reference to FIGS. 4 and 5. Flag updating is performed when the timer value is "0" (including a case in which the timer counter value overflows and indicates the next timer cycle) and when an algorithm computation is performed. Flag updating (step S102) to be performed when the timer value is "0" is performed for all the VPI/VCI data. Flag updating (step S103) based on algo-rithm computation is performed for only the VPI/VCI number of an arrival cell.

Figure 5:
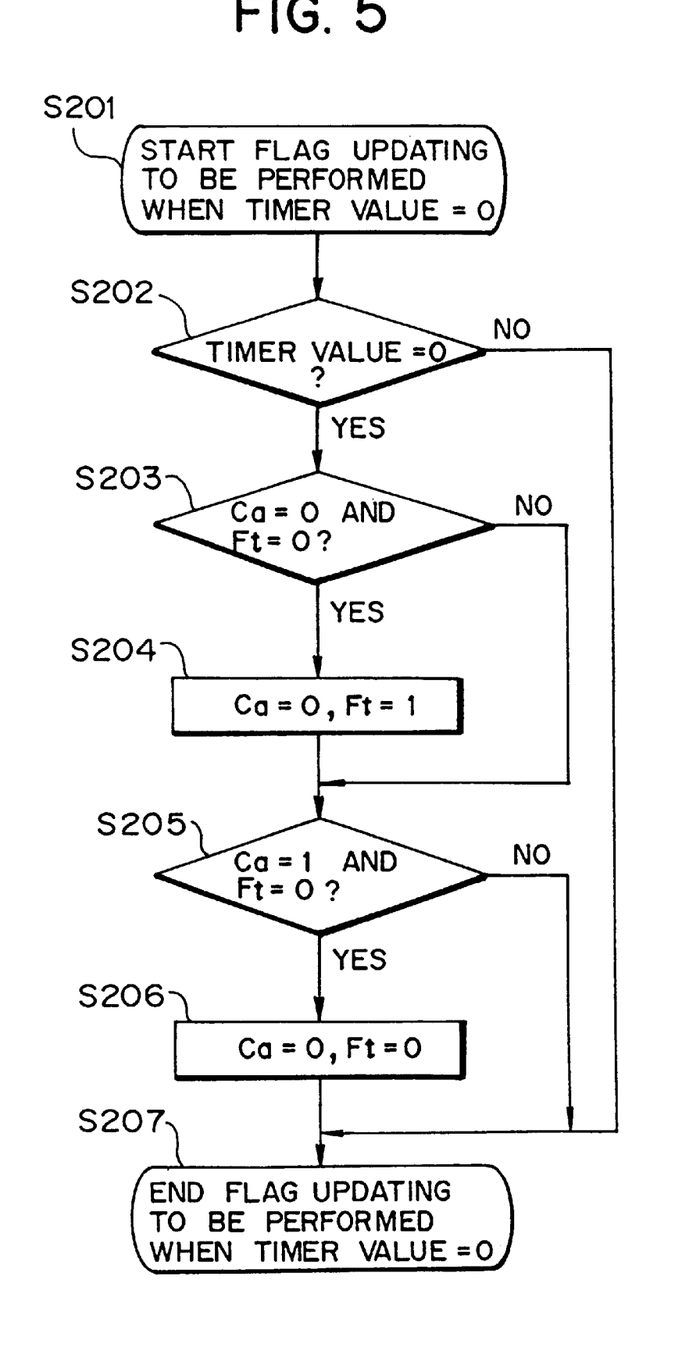
FIG. 5 is a flow chart showing flag updating processing to be performed when a timer value=0.

Flag updating to be performed when the timer value is "0" is performed in accordance with the flow chart of FIG. 5. More specifically, when step S201 is started after step S102, flag updating is started. In step S202, it is checked whether the timer value is "0". If the timer value is not "0", NO is obtained in step S202, and the processing is complete without performing flag updating.

If the timer value is "0", YES is obtained in step S202, and the flow advances to step S203. In step S203, it is checked whether both the flags Ca and Ft are "0". If both the flags are "0", YES is obtained in step S203, and the flow advances to step S204 to set the flags Ca and Ft to "0" and "1", respectively. The flow then advances to step S205. Otherwise, NO is obtained in step S203, and the flow advances to step S205.

In step S205, it is checked whether the flags Ca and Ft are "1" and "0", respectively. If YES in step S205, the flow advances to step S206 to set both the flags Ca and Ft to "0". The flow then advances to step S207. Otherwise, NO is obtained in step S205, and the flow advances to step S207.

② Shaping Processing

Figure 6:
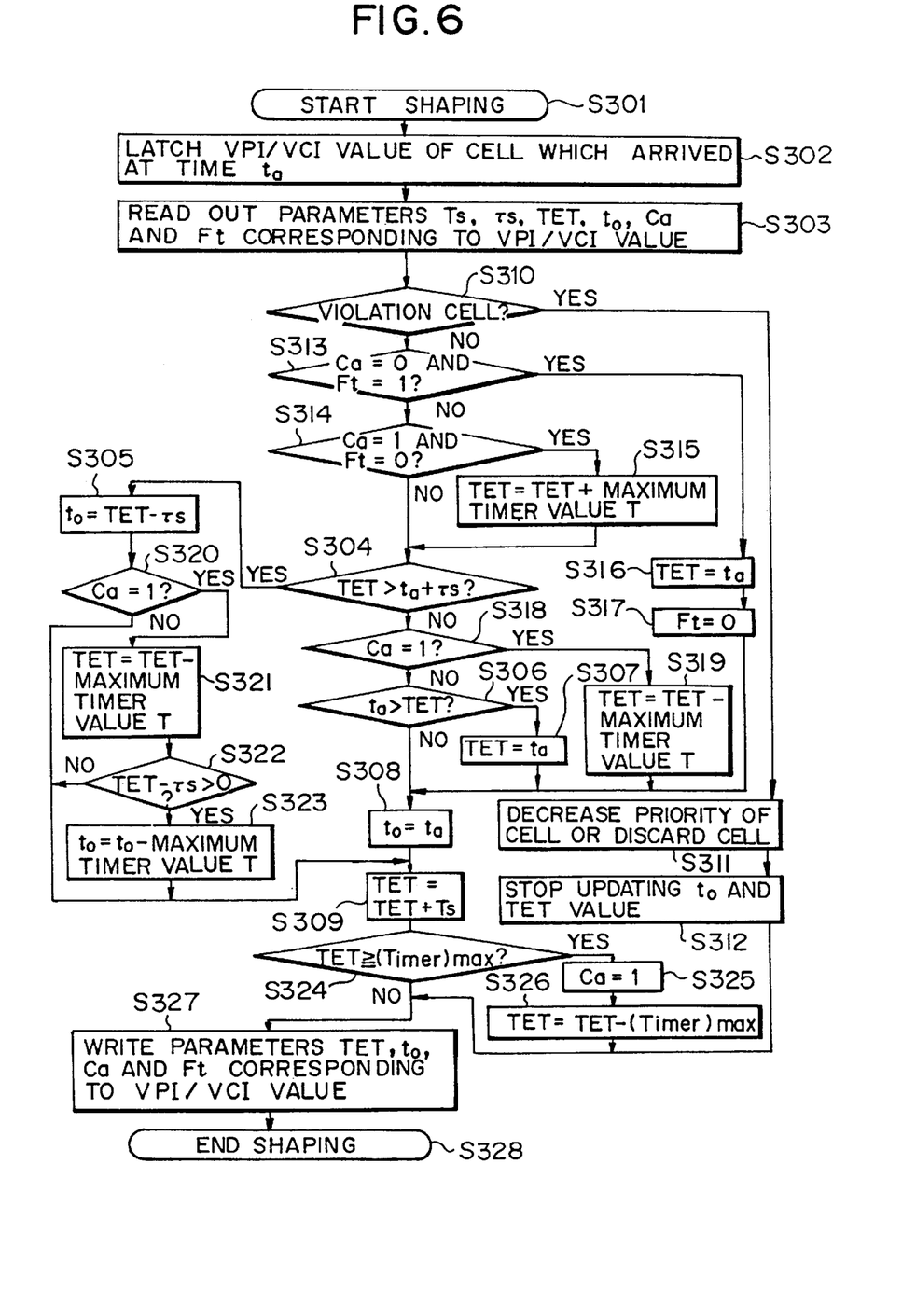
FIG. 6 is a flow chart showing a shaping operation including a flag updating operation.
Figure 7:
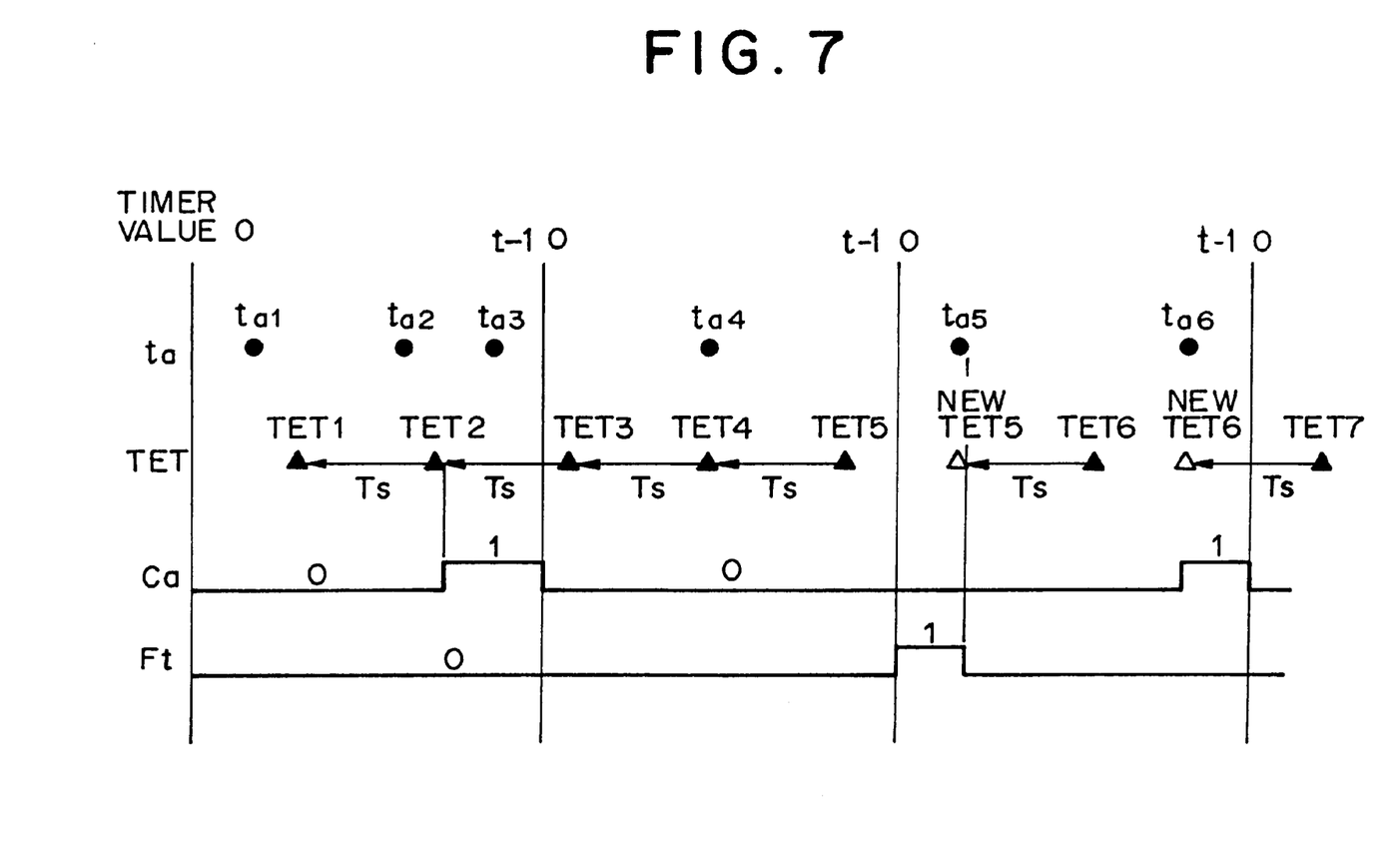
FIG. 7 is a timing chart for explaining shaping processing including a flag updating operation.
Figure 8:
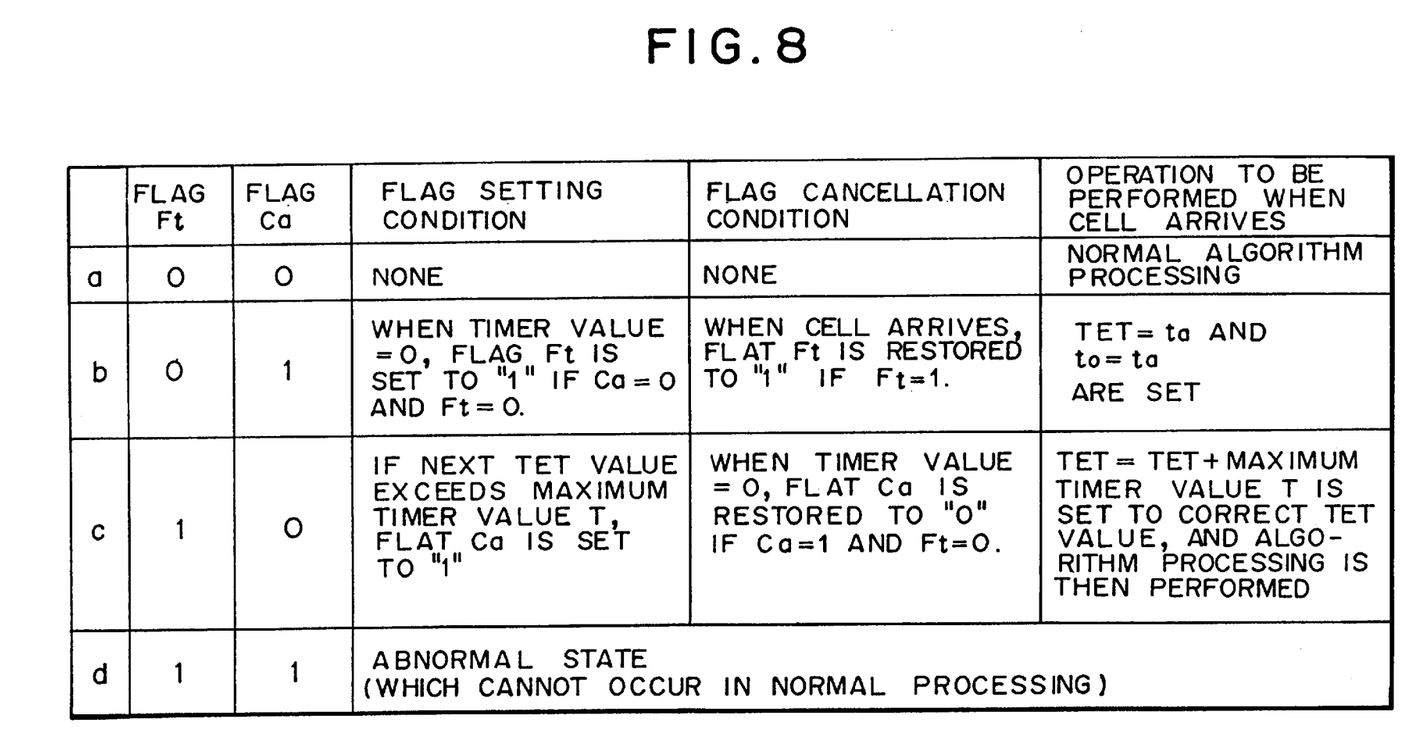
FIG. 8 is a view for explaining a flag updating method.

FIG. 6 is a flow chart showing shaping processing including the above flag updating operation. FIG. 7 is a timing chart showing a flag updating operation. FIG. 8 is a table summarizing the operations shown in FIGS. 5 and 6.

As shown in FIG. 7, the timer counts in a cycle of 0 to t-1. Consider "TET2" in FIG. 7. In the interval in which "TET3" obtained by adding the minimum cell interval Ts to "TET2" enters the next timer cycle, the flag Ca is set to "1". That is, in the flow chart of FIG. 6, YES is obtained in step S324, and the flow advances to step S325.

Once the flag Ca is set to "1", the theoretical transmission time TET of the cell which arrives within this timer cycle and has a VPI/VCI number always coincides with the next timer cycle. The flag Ca is therefore kept to "1". When the timer time becomes "0", the flag Ca is reset to "0" (see step S206 in FIG. 5).

If the flag Ca is "1" upon arrival of a cell, the TET value is corrected by setting TET=TET+maximum timer value T. If, for example, "TET3" is used for $t_{a3}$ in FIG. 7 without changing its TET value, $t_{a3}$>TET3. A proper algorithm computation cannot therefore be performed.

When the TET value corrected by setting TET3=TET3+ maximum timer value T, a proper relationship in magnitude is set between $t_{a3}$ and TET3, allowing a proper algorithm computation (the process of obtaining YES in step S314 in FIG. 6).

When the computation results are stored in the computation memory 6, the values to be stored are converted into values in the timer counter. For this reason, after the algorithm computation, the maximum timer value T must be subtracted from each value to which the maximum timer value T has been added. This processing is performed in steps S319, S321, S323, and S326 in FIG. 6.

The flag Ft indicates whether the cell arrival time $t_a$ comes in a cycle longer than the minimum cell interval Ts, and exceeds the maximum timer value. Consider, for example, "TET5" in FIG. 7. Since "$t_{a5}$" comes in the next timer cycle after "TET5", the flag Ft is set to "1" at time 0 in the next timer cycle. When a cell arrives at "$t_{a5}$" afterward, the flag Ft is reset to "0" after algorithm computation processing (the process of obtaining YES in step S313 in FIG. 6).

As described above, in shaping processing based on the minimum timer counter t using the two flags Ca and Ft, when flag Ca=0 and flag Ft=0 (a), since time management can be performed in a timer cycle, shaping processing is performed by a normal algorithm computation, as shown in FIG. 8. When flag Ca=1 an flag Ft=0 (b), TET=$t_a$ and $t_o$=$t_a$. When flag Ca=0 and flag Ft=1 (c), shaping processing is performed by an algorithm computation after the TET value is corrected by setting TET=TET+maximum timer value T.

When flag Ca=1 and flag Ft=1 (d), since this condition cannot occur in a normal state, processing is performed upon determination of the occurrence of an abnormal state.

As a result, shaping processing for equalizing cell flows is performed by time management based on relative times instead of absolute times. Therefore, the number of bits of the timer counter for an algorithm computation can be decreased, and the circuit size can be reduced, thereby realizing high-speed processing.

Conventional time management based on absolute times is realized by a 48-bit timer counter. In contrast to this, time management based on relative times in the present invention can be realized by a 21-bit timer counter. That is, the counter bit length can be reduced to ½ or less.

A modification of the above embodiment will be described next.

Figure 9:
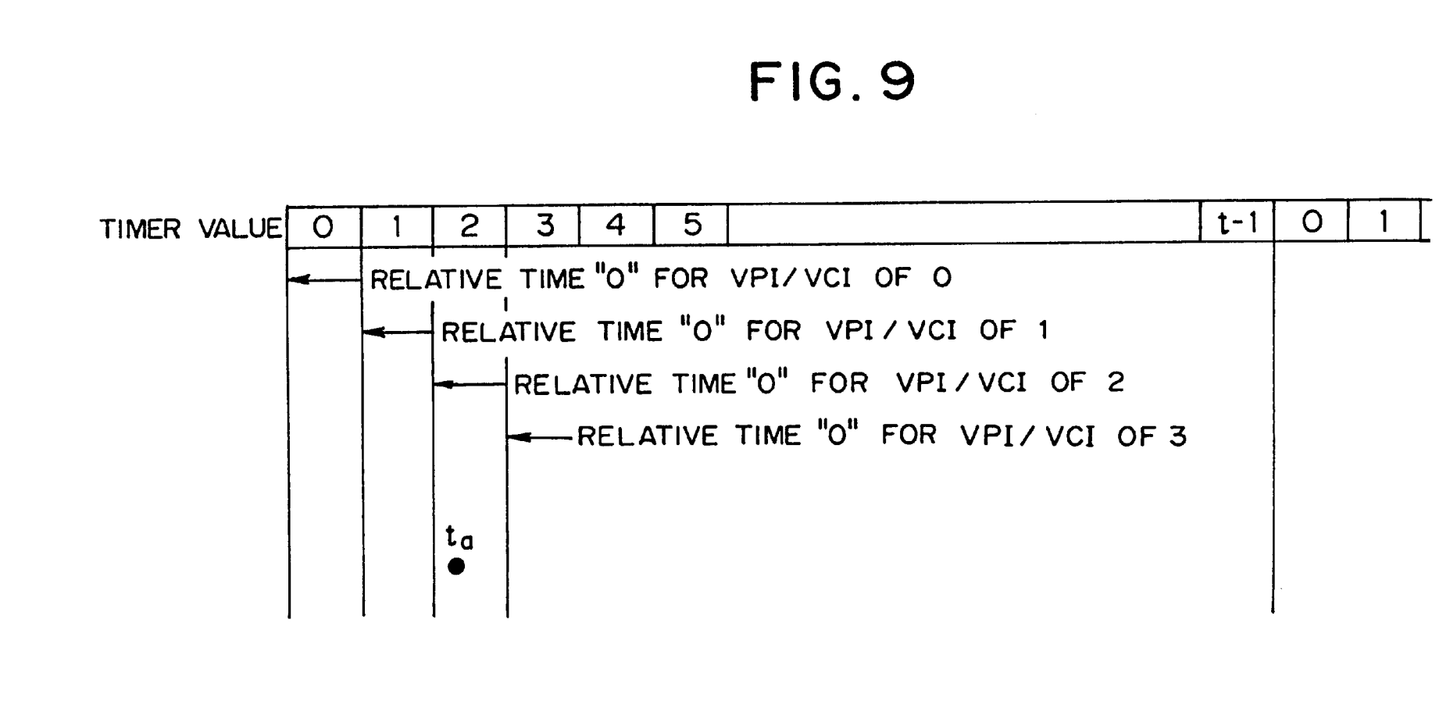
FIG. 9 is a view of explaining the concept of relative time 0 in a modification of the present invention.

In the above embodiment, a decrease in timer counter bit length is attained by using the flags Ca and Ft. In this modification, the position of time "0" is shifted in units of VPI/VCI numbers. This modification will be described below with reference to FIGS. 9 to 11.

In the above embodiment, as shown in FIG. 5, when the timer value is "0", flag updating must be performed for all the VPI/VCI data. In this case, when the number of VPI/VCI numbers used is small, the computation memory 6 can be accessed within a one-cell time. If, however, the number of VPI/VCI numbers used increases, e.g., VPI/VCI numbers are handled in thousands, the computation memory 6 cannot be accessed within a one-cell time.

To solve this problem, the flag updating timing is changed every VPI or VCI number. The concept of relative time "0" will be described with reference to FIG. 9. In this concept, an algorithm computation is performed under such a condition as setting a value of; each VPI or VCI number to relative time "0". Consider a cell which arrived at a timer value of 2 in FIG. 7. If the VPI/VCI number is 0, relative time "2" is obtained. If the VPI/VCI number is 1, relative time "1" is obtained. If the VPI/VCI number is 2, relative time "0" is obtained. If the VPI/VCI number 3, relative time "2–3+ timer counter value t" is obtained. That is, the value of the relative time is obtained by subtracting the VPI/VCI number from the arrival time of the cell. If this value becomes a negative value, the timer counter value t is added to the negative value.

Figure 10:
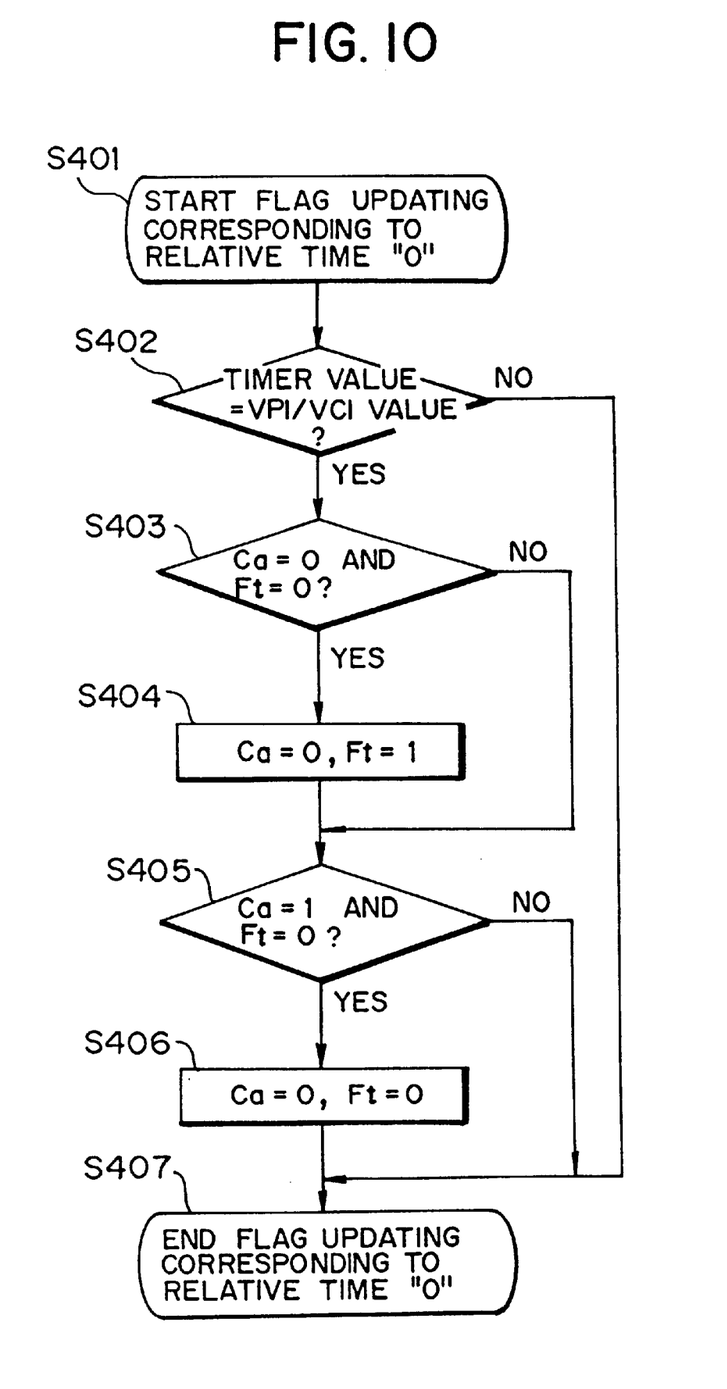
FIG. 10 is a flow chart showing a flag updating operation in the modification.
Figure 11:
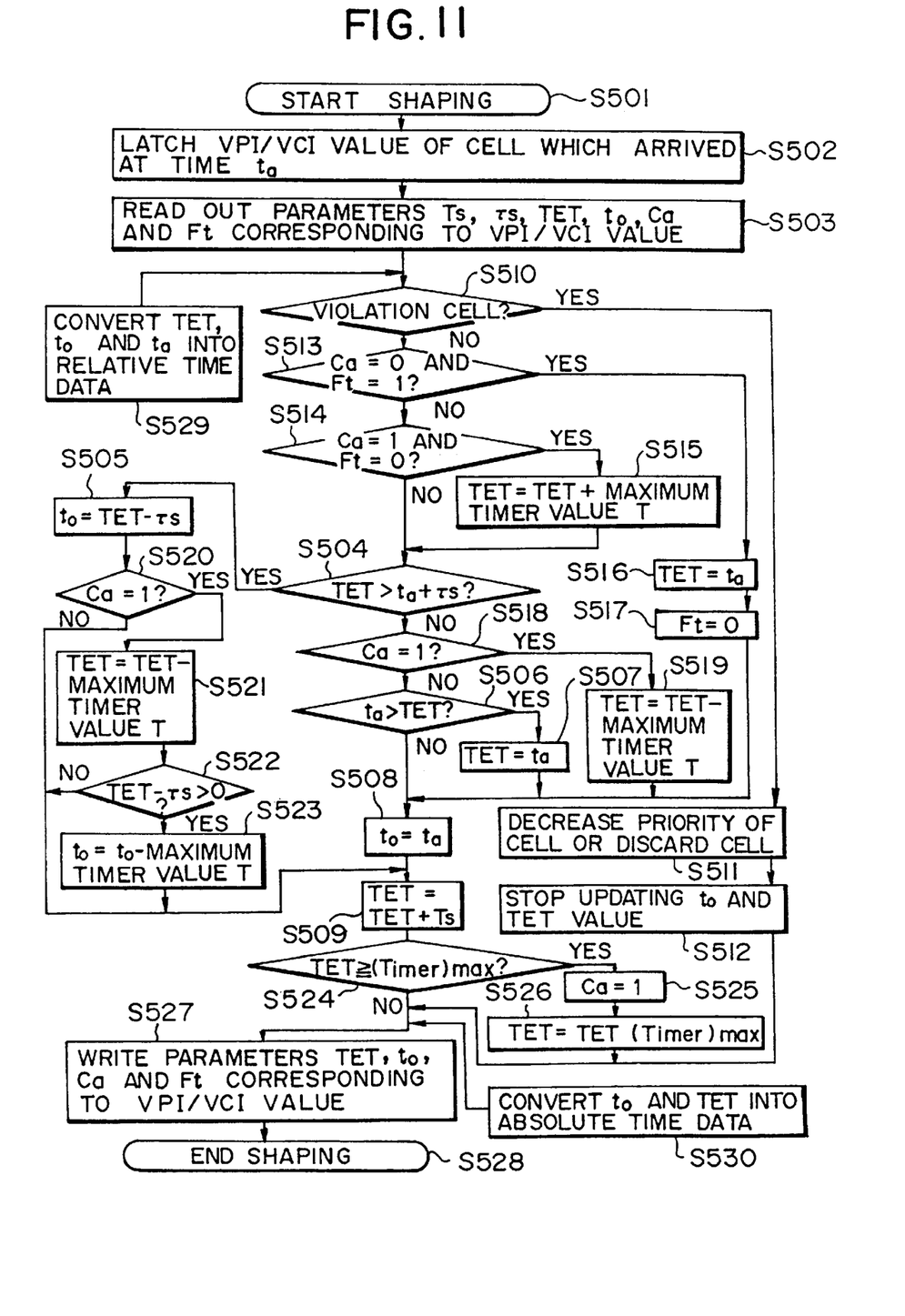
FIG. 11 is a flow chart showing a shaping operation in the modification.

With this processing, the flag updating processing shown in FIG. 5 is changed to the processing shown in the flow chart of FIG. 10, whereas the shaping processing shown in FIG. 6 is changed to the processing shown in the flow chart of FIG. 11. That is, the processing in step S202 in the flag updating processing in FIG. 5 is replaced by step S402 in FIG. 10, in which it is checked whether the timer value is equal to the VPI/VCI number.

The flow chart in FIG. 11 is identical to that in FIG. 6 except that steps S529 and S530 are added. In step S529, the absolute time data $t_o$, TET, and $t_a$ are converted into relative time data. In step S530, the relative time data TET and $t_o$ stored as the algorithm computation results in the computation memory 6 are converted into absolute time data.

With this processing, even a case in which the number of VPI/VCI numbers used increases can be properly handled.

As has been described above, according to the present invention, a shaping operation is performed by time management based on relative times by using a plurality of flags indicating whether the timer counter value has exceeded the maximum timer cycle value. As a result, the bit length of the timer counter can be decreased, and the circuit size can be reduced. In addition, since the bit length of the timer counter is decreased, the number of adders, subtracters, and the like can be decreased. Therefore, the computation time can be shortened to realize high-speed processing.

What we claim is:

1. An ATM network time management method, comprising:

performing a shaping operation to equalize cell flows by generating an arrival time of an ATM cell based on a relative time measured from an arrival time of a previous cell and arrival intervals of ATM cells to be inputted;

preparing a flag having at least one state, said flag indicating whether a value of a timer counter for generating said arrival time of the ATM cell has exceeded a maximum timer cycle value;

adding an optimum delay to the generated arrival time to obtain an ideal transmission time $t_o$ if said at least one state of said flag has a predetermined value; and performing the shaping operation of said ATM cell in accordance with said ideal transmission time $t_o$.

2. A method according to claim 1, wherein the flag comprises a first flag indicating whether a next TET value obtained by adding a minimum cell interval Ts to a theoretical transmission time TET has exceeded a maximum timer value and a next timer cycle has been started, and a second flag indicating whether the cell arrival time $t_a$ of an ATM cell has come in a cycle longer than a minimum cell interval Ts, and has exceeded the maximum value of the timer.

3. A method according to claim 2, wherein the first and second flags are prepared in units of VPI/VCI numbers of input cells.

4. A method according to claim 2, further comprising:

setting the first flag to "0" when the next TET value obtained by adding the minimum cell interval Ts to the theoretical transmission time TET has exceeded the maximum timer value, and the next timer cycle has been started, and setting the first flag to "1" when the next TET value has not exceeded the maximum timer value, and the next timer cycle has not been started;

setting the second flag to "1" when the cell arrival time $t_a$ of the ATM cell has come in a cycle longer than the minimum cell interval Ts, and has exceeded the maximum value of the timer, and setting the second flag to "0" when the cell arrival time $t_a$ has not come in a cycle longer than the minimum cell interval Ts, and has not exceeded the maximum value of the timer;

performing a first shaping operation when the first and second flags are set to "0";

setting the theoretical transmission time TET to be equal to the arrival time $t_a$ of the ATM cell, and setting the ideal transmission time $t_o$ to be equal to the arrival time $t_a$ of the ATM cell when the first and second flags are respectively set to "1" and "0";

performing a second shaping operation by correcting the theoretical transmission time TET according TET= TET+maximum timer value then the first and second flags are respectively set to "0" and "1"; and performing processing for an abnormal state when both the first and second flags are set to "1".

5. A method according to claim 1, wherein a timing at which the flag is updated is shifted in units of VPI/VCI numbers.

* * * * *